United States Patent [19]

Ishizawa et al.

[11] Patent Number: 4,712,531
[45] Date of Patent: Dec. 15, 1987

[54] APPARATUS FOR ADJUSTING SPECIFIC VOLUME OF INTAKE AIR FOR ENGINE

[75] Inventors: Isamu Ishizawa; Sigeo Tamaki, both of Katsuta, Japan

[73] Assignee: Hitachi, Ltd., Tokyo, Japan

[21] Appl. No.: 731,734

[22] Filed: May 8, 1985

[30] Foreign Application Priority Data

May 18, 1984 [JP] Japan ................. 79-100767

[51] Int. Cl.[4] .................. F02M 15/00; F02M 23/14
[52] U.S. Cl. ...................... 123/556; 123/585; 261/63; 261/142
[58] Field of Search ............... 123/552, 549, 556, 585; 261/142, 63

[56] References Cited

U.S. PATENT DOCUMENTS

| 1,525,824 | 2/1925 | Palmer | 123/549 |
| 2,115,634 | 4/1938 | Kiesel | 123/549 |
| 2,139,777 | 12/1938 | Skok | 123/549 |
| 2,155,670 | 4/1939 | MacBeth | 123/585 |
| 3,787,037 | 1/1974 | Motooka | 261/142 |
| 3,996,315 | 12/1976 | Herail | 123/585 |
| 4,177,778 | 12/1979 | Naitou et al. | 123/556 |
| 4,234,522 | 11/1980 | Fontanet et al. | 261/23 A |
| 4,308,845 | 1/1982 | Sarto | 123/549 |
| 4,387,690 | 6/1983 | Chiavaroli | 123/549 |
| 4,463,721 | 8/1984 | Hayashi | 123/552 |

FOREIGN PATENT DOCUMENTS

| 354909 | 6/1922 | Fed. Rep. of Germany | 123/549 |
| 2536432 | 2/1977 | Fed. Rep. of Germany | . |
| 2843534 | 4/1979 | Fed. Rep. of Germany | . |
| 148658 | 11/1981 | Japan | 123/549 |

Primary Examiner—William A. Cuchlinski, Jr.
Attorney, Agent, or Firm—Antonelli, Terry & Wands

[57] ABSTRACT

An apparatus for adjusting the specific volume of intake air for an engine has an orifice for controlling the amount of air to by-pass a throttle valve. The apparatus is provided with a lattice-shaped heating element which is disposed on the downsteam side of the orifice. Thus, carbon and other substances which may flow back from the engine are trapped and burnt by the heating element.

11 Claims, 4 Drawing Figures

APPARATUS FOR ADJUSTING SPECIFIC VOLUME OF INTAKE AIR FOR ENGINE

FIELD OF THE INVENTION AND RELATED ART STATEMENT

The present invention relates to an apparatus for adjusting the specific volume of intake air for an engine, in particular, an improved apparatus for adjusting the specific volume of intake air for an engine including a by-pass passage which is formed with a variable orifice and by-passes an intake passage in which a throttle valve is provided.

Two types of automotive engines have been proposed, with one type having an air-fuel mixture by a carburetor by making use of a vacuum produced during the intake stroke, and with the amount of the air-fuel mixture supplied being controlled by varying a degree of opening of a throttle valve. The other type of automotive engine includes a fuel injection valve disposed in an intake passage with the specific volume of intake air being controlled by varying the degree of opening of a throttle valve, while the fuel injection amount is controlled by varying the period of time during which the fuel injection valve is open, whereby the amount of the air-fuel mixture as a whole is controlled. Since the latter type of engine involves a risk of the engine stalling as a result of reduction in the degree of opening of the throttle valve during idling of the engine, in order to prevent any occurrence of such a problem the engine is provided with a by-pass passage which by-passes the intake passage in which the throttle valve is provided, and any shortage of the specific volume of intake air required during idling is thereby replenished (see the specification of U.S. Pat. No. 3,866,583).

In the arrangement wherein the amount of airfuel mixture to be supplied is adjusted by employing a carburetor, the throttle valve is opened and closed in operatively associated relation with the accelerator pedal, and the fuel within the carburetor and the air passing through an air cleaner are mixed together and pass through the area around the throttle valve. Consequently, the throttle valve and the intake passage wall surface portion surrounding the valve are wet at all times. For this reason, even if back-fire gas or blowby gas flows backward as far as the vicinity of the throttle valve and the carbon and viscous substances contained in the gas adhere to the valve and its surrounding area, they are washed away by the airfuel mixture, whereby the throttle valve and the intake passage wall surface portion are kept relatively clean.

In the fuel injection type engine, however, air alone passes through the area around the throttle valve. Therefore, if back-fire gas or blowby gas flows backward, the carbon and viscous substances may adhere to the throttle valve and the intake passage wall surface portion surrounding the valve, thus causing reduction in the dimension of the gap between the throttle valve and the intake passage wall surface portion and the area of the orifice in the by-pass passage. In an extreme case, the specific volume of intake air supplied during low-speed running of the engine becomes insufficient, so that it is disadvantageously easy for the engine to stall.

It is a primary object of the present invention to provide an apparatus for adjusting the specific volume of intake air for an engine which is capable of preventing the adhesion of carbon or any viscous substance to an adjusting valve body and a valve seat which defines the orifice of the by-pass passage, thereby preventing the specific volume of intake air from becoming deficient even during low-speed engine running in which the amount of air passing through the by-pass passage is small.

To this end, the present invention provides an apparatus for adjusting the specific folume of intake air for an engine in which a heating element is provided on the downstream side of an orifice in a by-pass passage which by-passes an intake passage provided therein with a throttle valve which adjusts the specific volume of intake air, the heating element allowing the intake air to pass therethrough.

The above and other objects, features and advantages of the present invention will become clear from the following description of the preferred embodiments thereof, taken in conjunction with the accompanying drawings.

DETAILED DESCRIPTION

The present invention will be described hereinunder in detail through embodiments and with reference to FIGS. 1 to 4.

Figure 1:
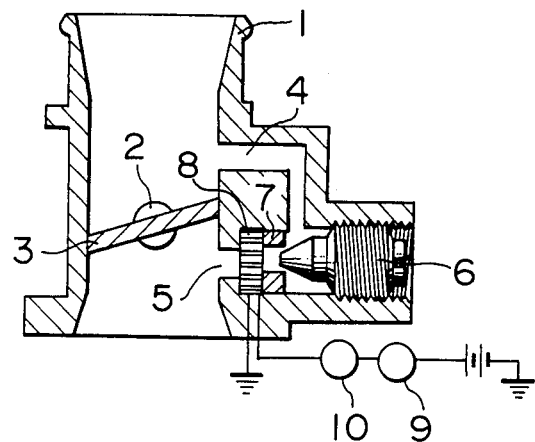
FIG. 1 is a schematic sectional view of one embodiment of the apparatus for adjusting the specific volume of intake air for an engine according to the present invention.

Referring first to FIG. 1, according to the present invention, an apparatus for adjusting the specific volume of intake air for an engine includes an air valve main body 1 formed with an intake passage in which is installed a throttle valve 3 supported by a shaft 2. A fuel injection valve (not shown) is installed on the downstream side of the throttle valve 3. The air valve main body 1 is further formed with an idling air passage (by-pass passage) 4 which by-passes the throttle valve 3. An adjusting valve body 6 and a valve seat 7 for adjusting the orifice area are installed in the vicinity of an outlet-side passage 5 of the by-pass passage 4.

During idling, the throttle valve 3 is in a nearly full closed position. Consequently, the air intake during idling is supplied into the combustion chamber of the engine through the by-pass passage 4.

In such an arrangement, the carbon and viscous substances contained in back-fire gas, blowby gas or EGR gas may gather on the downstream side of the throttle valve 3 and finally adhere to the respective distal end portions of the valve seat 7 and the adjusting valve body 6 installed in the by-pass passage 4. Consequently, the orifice area is undesirably reduced, and the flow rate of the air passing through the by-pass passage 4 is decreased correspondingly thereby causing a reduction in the idling speed of the engine and, in the worst case, the engine may stall. In order to prevent any occurrence of such a problem, the embodiment of the present invention shown in FIG. 1 employs a lattice-shaped heating element 8 which has a relatively small resistance to passage of air and is disposed on the downstream side of the adjusting valve body 6 and the valve seat 7 in the by-pass passage 4, whereby carbon and viscous substances which may undesirably flow back into the by-pass passage 4 are caused to adhere to the lattice of the heating element 8 before contacting the valve seat 7 or the adjusting valve body 6. The heating element 8 is connected with a vehicle speed switch 10 which is connected in series to an ignition switch 9. The vehicle speed switch 10 is adapted to energize the heating element 8 when the vehicle speed exceeds a predetermined value for reasons set forth more fully hereinbelow. When the switch 10 turns on, the heating element 8 is caused to heat up and burn the carbon and other substances adhering to the lattice. If the heating element 8 is supplied with electric current during an idling operation, since, at this time, no voltage is applied to the battery by the generator, the battery voltage drops, so that it cannot apply a sufficiently high voltage to the spark plug. As a result, the engine speed becomes unstable, and, in the worst case, the engine may stall.

It is to be noted that the heating element 8 is preferably provided as close to the engine as possible, because carbon and viscous substances more easily adhere to the heating element 8 if it is closer to the engine. Further, the smaller the gap between individual lattice bars constituting the heating element 8, the more easily carbon and other substances adhere to the heating element 8. It is, however, necessary for the entire air passage area of the heating element 8 to be larger than the area of the orifice defined by the valve seat 7 and the adjusting valve body 6.

According to the above-described embodiment of the invention, carbon and viscous substances which may flow back into the by-pass passage 4 are caused to adhere to the lattice-shaped heating element 8 before contacting the valve seat 7 or the adjusting valve body 6 and are burnt by the heat generated by the heating element 8. It is therefore possible to prevent any adhesion of carbon and viscous substances to the adjusting valve body 6 or the valve seat 7 in the by-pass passage 4. Accordingly, it is possible to prevent the specific volume of intake air from becoming deficient during a low-speed engine running in which the amount of the air passing through the by-pass passage 4 is small.

Figure 2:
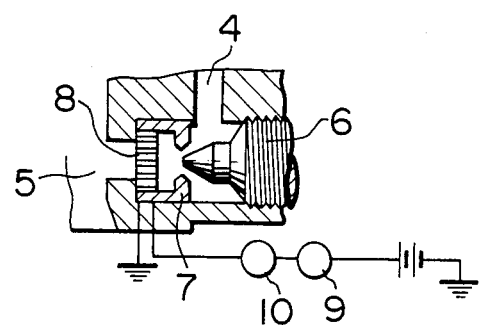
FIG. 2 is a sectional view of an essential part of the arrangement shown in FIG. 1, which shows another embodiment of the invention.

Although in the embodiment shown in FIG. 1 the heating element 8 is mounted on the air valve main body 1, together with the valve seat 7, in the embodiment shown in FIG. 2 the valve seat 7 is formed with a sharp-edged shape and the lattice-shaped heating element 8 is housed inside the valve seat 7.

Figure 3:
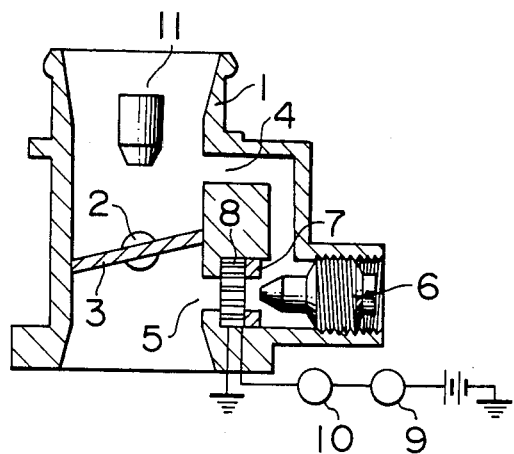
FIGS. 3 and 4 are schematic sectional views of other embodiments, respectively, of the apparatus according to the present invention.
Figure 4:
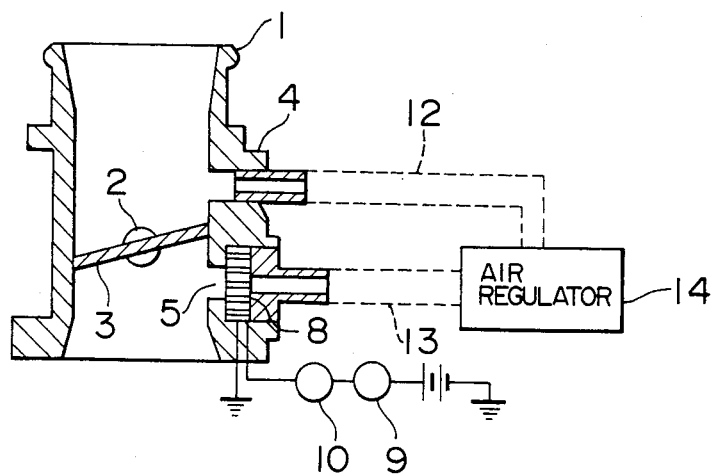

It is to be noted that the present invention has been described above through its embodiments in an apparatus for adjusting the specific volume of intake air for a fuel injection type engine in which the fuel injection valve is disposed on the downstream side of the throttle valve 3, it may also be applied to another type of engine in which a fuel injection valve 11 is disposed on the upstream side of the throttle valve 3 in the manner shown in FIG. 3, and it is still possible to obtain an advantageous effect similar to the above.

Further, the invention may be applied to still another type of engine which is provided with an air regulator 14 which controls the idling speed of the engine during warming up or an air amount control valve 14 which operates during deceleration and when the cooler is switched on, the air regulator or the air amount control valve 14 being connected to the inlet side of the by-pass passage 4 through an air inlet pipe 12 and connected to the outlet-side passage 5 through an air outlet pipe 13.

In such a case also, it is possible to obtain an advantageous effect similar to that described above.

As has been described, the present invention advantageously makes it possible to prevent any adhesion of carbon and viscous substances to the adjusting valve body or the valve seat in the by-pass passage and, consequently, to prevent the specific volume of intake air from becoming deficient during low-speed engine running in which the amount of the air passing through the by-pass passage is small.

Although the invention has been described through specific terms, it is to be noted here that the described embodiments are not exclusive and various changes and modifications may be imparted thereto without departing from the scope of the invention which is limited solely by the appended claims.

What is claimed is:

1. In an apparatus for adjusting a specific volume of intake air for an engine of the type having a by-pass passage which by-passes a throttle valve for adjusting the specific volume of intake air flowing through an intake passage, and an orifice defined by an adjusting valve body and a valve seat and adapted to adjust the specific volume of intake air passing through said by-pass passage, the improvement comprising a heating element provided on a downstream side of said orifice in said by-pass passage, said heating element allowing said intake air to pass therethrough, said heating element is formed so as to have a lattice shape, and wherein said valve seat is formed so as to have a sharp-edged shape, said latticeshaped heating element being integrated with said valve seat.

2. An apparatus according to claim 1, wherein said heating element is caused to heat up on being energized when a vehicle speed exceeds a predetermined value.

3. In an apparatus for adjusting a specific volume of intake air for an engine of the type having a by-pass passage which by-passes a throttle valve for adjusting a specific volume of intake air flowing through an intake passage, and an orifice defined by an adjusting valve body and a valve seat and adapted to adjust the specific volume of intake air passing through said by-pass passage, the improvement comprising a heating element provided on a downstream side of said orifice in said by-pass passage, said heating element allowing said intake air to pass therethrough, and wherein said heating element is caused to heat up on being energized when a vehicle speed exceeds a predetermined value.

4. In an apparatus for adjusting a specific volume of intake air for an engine of the type having a by-pass passage which by-passes a throttle valve for adjusting the specific volume of intake air flowing through an intake passage, and an orifice defined by an adjusting valve body and a valve seat and adapted to adjust the specific volume of intake air passing through said by-pass passage, the improvement comprising a heating element provided on a downstream side of said orifice in said by-pass passage, said heating element allowing said intake air to pass therethrough, said heating element is formed so as to have a lattice shape, and wherein said heating element is caused to heat up on being energized when a vehicle speed exceeds a predetermined value.

5. In an apparatus for adjusting a specific volume of intake air for an engine of the type having a by-pass passage which by-passes a throttle valve for adjusting the specific volume of intake air flowing through an intake passage, and an orifice defined by an adjusting valve body and a valve seat and adapted to adjust the specific volume of intake air passing through said by-pass passage, the improvement comprising a heating element provided on a downstream side of said orifice in said by-pass passage, said heating element allowing said intake air to pass therethrough, said heating element is formed so as to have a lattice shape, said lattice-shaped heating element being mounted on a member on which said valve seat is mounted, and wherein said heating element is caused to heat up on being energized when a vehicle speed exceeds a predetermined value.

6. An apparatus for adjusting a specific volume of intake air for an engine including a by-pass passage means for bypassing a throttle valve means for adjusting the volume of intake air flowing through an intake passage, an adjusting valve body means disposed in said bypass passage means cooperable with a valve seat means for adjusting an outlet orifice area of the bypass passage means to thereby adjust a volume of intake air passing through said bypass passage means, wherein means are provided in said bypass passage means on a downstream side of said outlet orifice area for preventing a backflow of carbon and viscous substances into the bypass passage means and for burning carbon and viscous substances adhering thereto.

7. An apparatus according to claim 6, wherein said means for preventing a backflow and for burning carbon and viscous substances includes a heating element arranged at an outlet end of said bypass passage means.

8. An apparatus according to claim 7, wherein said heating element has a lattice shape.

9. An apparatus according to claim 6, wherein said means for preventing backflow and for burning carbon and viscous substances is integrated with said valve seat means.

10. An apparatus according to claim 9, wherein said valve seat means has a sharp edged shape.

11. An apparatus according to claim 7, wherein means are provided for energizing the heating element when a speed of a vehicle accommodating engine exceeds a predetermined value.

* * * * *